(12) United States Patent
Mueller

(10) Patent No.: US 7,950,853 B2
(45) Date of Patent: May 31, 2011

(54) LINEAR ROLLER BEARING ELEMENT

(75) Inventor: Arnold Mueller, Kirchheim/Teck (DE)

(73) Assignee: AMK Arnold Mueller GmbH & Co. KG, Kirchheim/Teck (DE)

( * ) Notice: Subject to any disclaimer, the term of this patent is extended or adjusted under 35 U.S.C. 154(b) by 855 days.

(21) Appl. No.: 11/859,853

(22) Filed: Sep. 24, 2007

(65) Prior Publication Data

US 2008/0152268 A1  Jun. 26, 2008

(30) Foreign Application Priority Data

Dec. 21, 2006  (DE) .......................... 10 2006 060 609

(51) Int. Cl.
*F16C 29/06* (2006.01)
*F16C 29/04* (2006.01)

(52) U.S. Cl. ................................. 384/44; 384/7; 384/45

(58) Field of Classification Search .................... 384/23, 384/43–45, 49, 51, 54, 7, 10, 13, 15
See application file for complete search history.

(56) References Cited

U.S. PATENT DOCUMENTS

| | | | | |
|---|---|---|---|---|
| 4,553,793 A * | 11/1985 | Teramachi | ....................... | 384/45 |
| 5,829,885 A * | 11/1998 | Scheich | ........................... | 384/45 |
| 6,086,254 A * | 7/2000 | Lyon | .............................. | 384/44 |
| 6,170,986 B1 * | 1/2001 | Hsu et al. | ........................ | 384/15 |
| 6,517,245 B2 * | 2/2003 | Luo et al. | ......................... | 384/45 |
| 6,561,056 B2 * | 5/2003 | Maffeis | ............................. | 384/43 |
| 6,807,746 B2 * | 10/2004 | Matsumoto | ...................... | 33/706 |
| 7,465,092 B2 * | 12/2008 | Hsu et al. | ........................ | 384/43 |
| 2006/0140517 A1 * | 6/2006 | Moseberg et al. | .............. | 384/45 |
| 2007/0110345 A1 * | 5/2007 | Hsu et al. | ........................ | 384/45 |

FOREIGN PATENT DOCUMENTS

EP            790421 A1 *  8/1997

* cited by examiner

*Primary Examiner* — Marcus Charles
(74) *Attorney, Agent, or Firm* — Michael J. Striker

(57) ABSTRACT

A linear roller bearing element with an endless rolling element channel is composed of a carrier raceway for the load-bearing rolling elements on a carrier body, a return channel for rolling elements that are returning, and turnaround channels that connect the carrier raceway and the return channel at both ends with each other in an endless manner, the turnaround channels being bounded by end covers. The roller bearing element has two rolling element channels with two longitudinally extending carrier raceways located next to each other within a common plane and with clearance between them, on the carrier body for load-bearing rolling elements, and two assigned return channels for rolling elements that are returning, and respective turnaround channels. With a linear roller bearing guide, these roller bearing elements are located between a guide rail and a guide carriage—which is supported such that it is displaceable relative to the guide rail—in order to provide support.

27 Claims, 6 Drawing Sheets

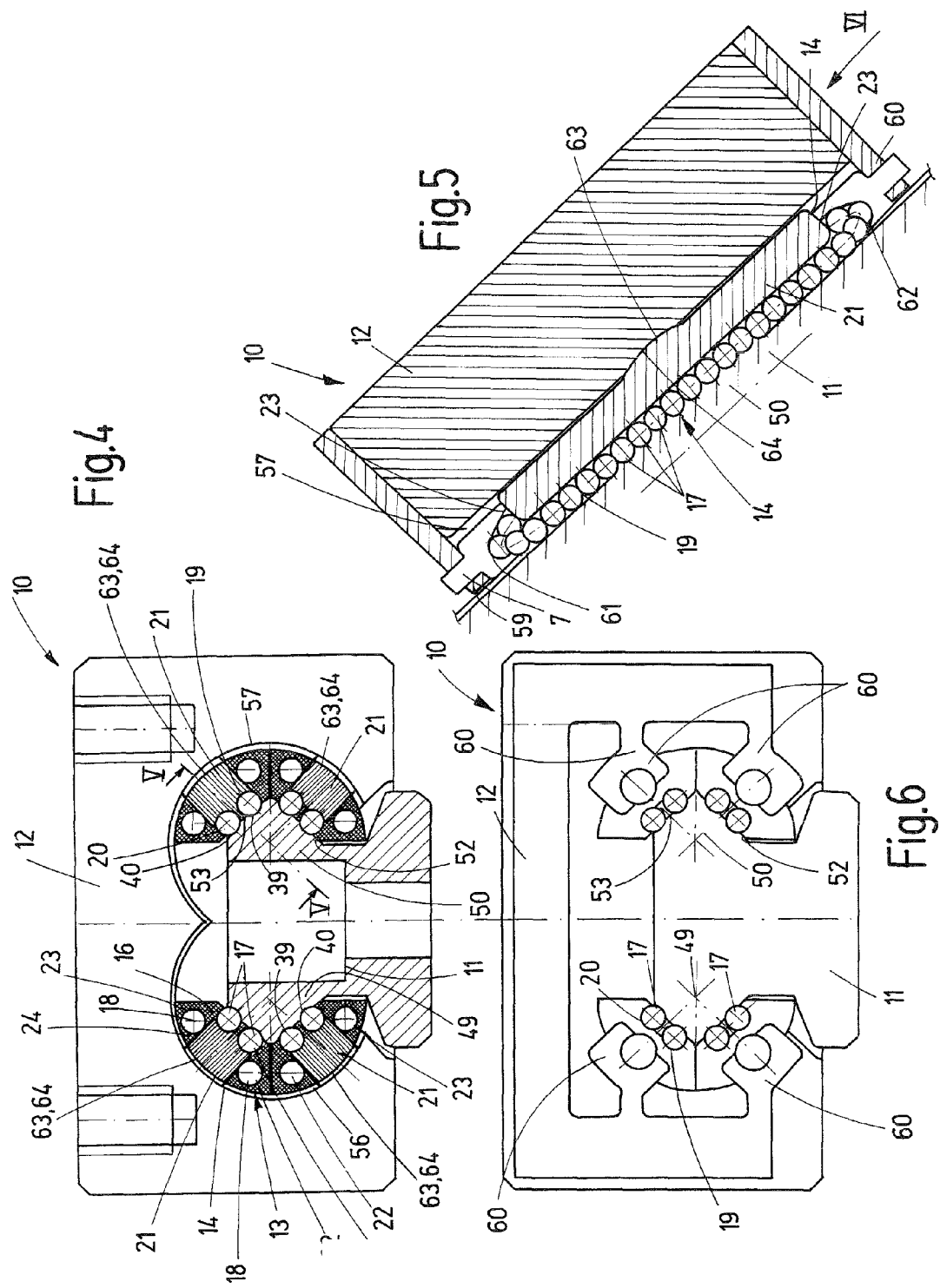

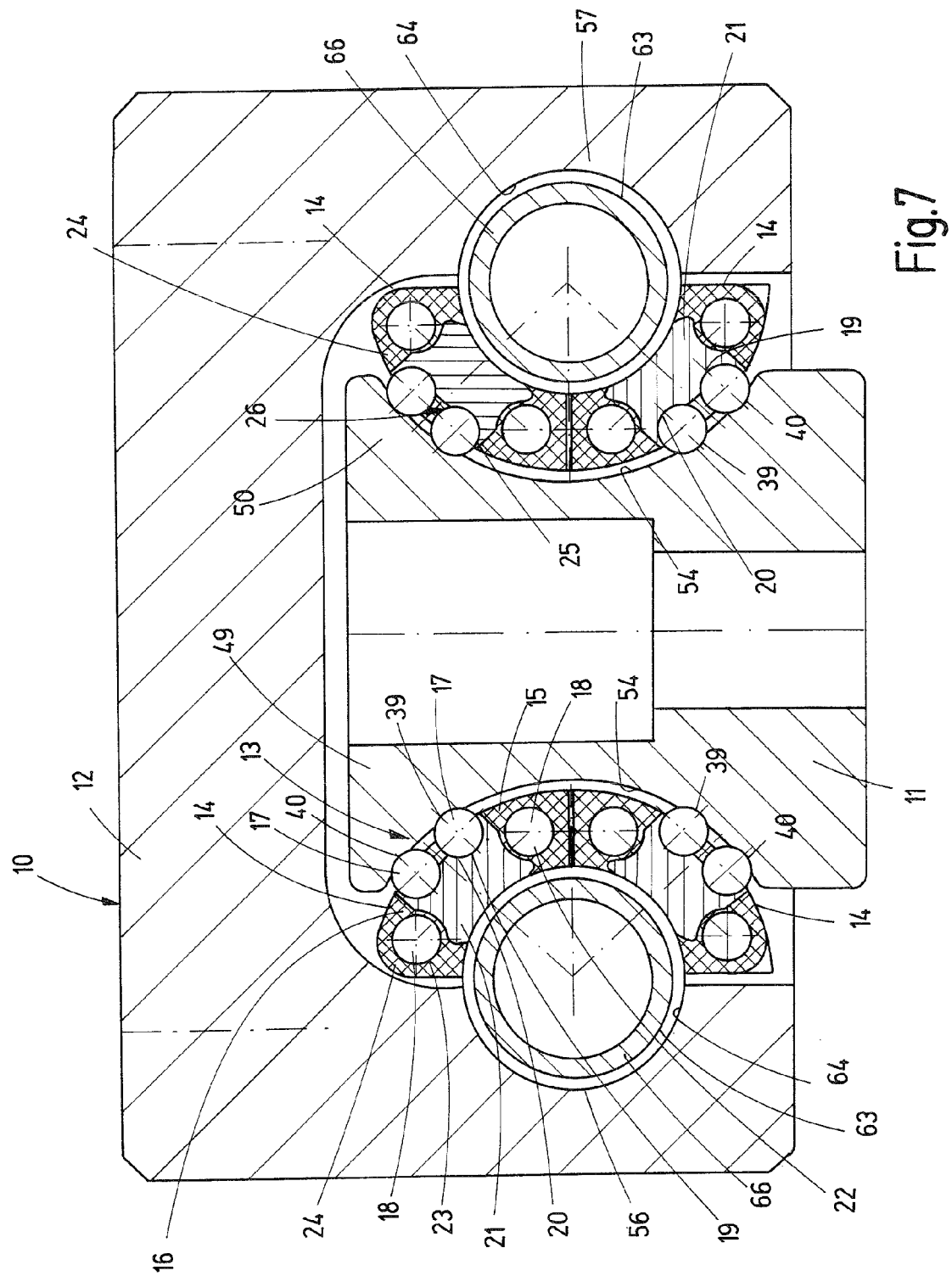

LINEAR ROLLER BEARING ELEMENT

CROSS-REFERENCE TO A RELATED APPLICATION

The invention described and claimed hereinbelow is also described in German Patent Application DE 10 2006 060 609.4 filed on Dec. 21, 2006. This German Patent Application, whose subject matter is incorporated here by reference, provides the basis for a claim of priority of invention under 35 U.S.C. 119(a)-(d).

BACKGROUND OF THE INVENTION

The present invention relates to a linear roller bearing element.

Linear roller bearing elements of this type are used for linear roller bearing guides, with which the roller bearing elements are located between a guide rail and a guide carriage supported on the guide rail such that it is displaceable relative thereto. Roller bearing guides of this type are known and are available in diverse configurations. They are composed of a solid guide carriage, which may be moved via the rolling elements on the guide rail, relative to the guide rail. Systems are used that are known with regard for roller bearings. The profile of the raceway has a gothic shape, or it approximates the segment of a circular arc. Systems having four rows, six rows, or an even greater number of rows are known. Since the guide rail and the guide carriage are composed of solid metal—steel, in particular—a deformation takes place when force is applied off-center, i.e., when loads are applied obliquely, when torque is applied, or the like.

The deformation results in different deflections of the spherical rolling elements and uneven deformations of the carrier body. With low-profile, narrow guide carriage bodies, which have a small cross section and therefore have only a small amount of support material available, this therefore results in uneven running and negative effects on the service life. If, e.g., torque loads are applied around the rail longitudinal axis, the outwardly lying guide raceways are stressed heavily, while the inwardly lying guide raceways are less involved in the load transfer. The points of contact are displaced significantly. To account for this, the raceways of the guide rail must be ground very deep. This is very costly. In addition, the contact surfaces may only be used to a limited extent, so the dimensions of the roller bearing guide must be increased, or its maximum loading capacity must be reduced, to prevent the running behavior from becoming seriously impaired.

Linear roller bearing elements have become known, with which, in terms of the support in the guide carriage, the carrier body is self-adjusting in a swiveling manner around a longitudinal axis. To this end, the carrier body includes a partially cylindrical outer surface, which is accommodated in an assigned, appropriately shaped groove of the guide carriage. The disadvantage of this is that the carrier bodies may become displaced relative to the return of the rolling elements, which takes place in the guide carriage. This results in poorer-quality running, increased noise development, and a relatively high load on the rolling elements.

SUMMARY OF THE INVENTION

Accordingly, it is an object of the present invention to create a linear roller bearing element of the type described in the preamble, which enables the rolling elements to circulate smoothly without being subjected to greater loads, with a minimum of noise, using simple means.

In keeping with these objects and with others which will become apparent hereinafter, one feature of the present invention resides, briefly stated, in a linear roller bearing element, comprising an endless rolling element channel composed of a carrier raceway for load-bearing rolling elements on a carrier body, a return channel for rolling elements that are returning, and turnaround channels that connect the carrier raceway with the return channel at both ends in an endless manner, wherein the turnaround channels are bounded by end covers, and a further rolling element channel with a further carrier raceway, a further return channel for rolling elements that are returning, and further turnaround channels that connect the further carrier raceway with the further return channel at both ends in an endless manner, so that the linear roller bearing element has two rolling element channels with two carrier raceway which extends longitudinally and are located next to each other within a common plane and with a clearance between them on the carrier body for load-bearing rolling elements, two return channels for the rolling elements that are returning, and two turnaround channels.

As a result, individual, independent and ready-to-install raceway elements are created, with which the individual raceways remain in a fixed, permanent relation to each other. The raceway elements include the carrier raceway, return, and turnaround, including the rolling elements. Due to this fixed, permanent relationship, there is no risk that, e.g., the return channels may become displaced relative to the carrier raceways of the carrier body.

The roller bearing element operates quietly, with low wear and the associated long service life, is small and compact, and requires very little installation space when installed in a linear roller bearing guide. In this state, due to the single-axis or biaxial, convex or concave curvature on the back side of the carrier body, the roller bearing element enables the carrier body to automatically adapt to the course of the raceways of the guide rail, and to distribute the load on the individual rolling elements as evenly as possible. As a result, essentially the same load is applied in each row, in every load state.

Furthermore, since the particular return channels are located on the side, the carrier body may be designed small and compact in terms of its cross-sectional expansion, since its support cross section need not be reduced by return channels that would extend in the region of the carrier body. The same applies for the support region of the guide carriage, on which the carrier body rests. This support cross section does not need to be reduced in size and therefore weakened, either, as a result of the location of the return channels. It is advantageous that the support of the raceway elements therefore takes place via the back of the carrier body in a solid region of the guide carriage. The stiffness of a roller bearing guide is increased as a result. The manufacturing costs are also reduced. It is also advantageous that the raceway elements are acted upon with a spring force acting in the direction of the guide rail. As a result, even when play should arise on one side when force is applied, therefore resulting in displacement, the particular raceway element is still pressed with the rolling elements against the guide rail thereby ensuring constant contact between the rolling elements and the related guide surfaces and preventing flat spots from forming on the rolling elements.

This is advantageous with highly dynamic drives in particular, since all load bearing rolling elements are accelerated by the contact with the guide raceways. This results in a roller bearing circulation without slip. This makes it possible to design the raceways for the rolling elements as a four-point contact bearing with a small contact angle. In this manner, the load-bearing capacity of the rolling element contact may be nearly doubled. This results in linear roller bearing guides with extremely high load-bearing capacities.

It is also a further feature of the present invention to provide the linear roller bearing guide which has a guide carriage supported on a guide rail displaceably relative to the latter; and at least one linear roller bearing element located between the guide rail and the guide carriage in order to guide the guide carriage and configured as defined in claim 1.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 shows a schematic, vertical cross section of a linear roller bearing guide according to a third exemplary embodiment, FIG. 5 shows a schematic cross section along the line V-V in FIG. 4, FIG. 6 shows a schematic, front-side view of the linear roller bearing guide in the direction of arrow VI in FIG. 5, FIG. 7 shows a schematic, vertical cross section of a linear roller bearing guide according to a fourth exemplary embodiment.

DESCRIPTION OF THE PREFERRED EMBODIMENTS

Figure 1:
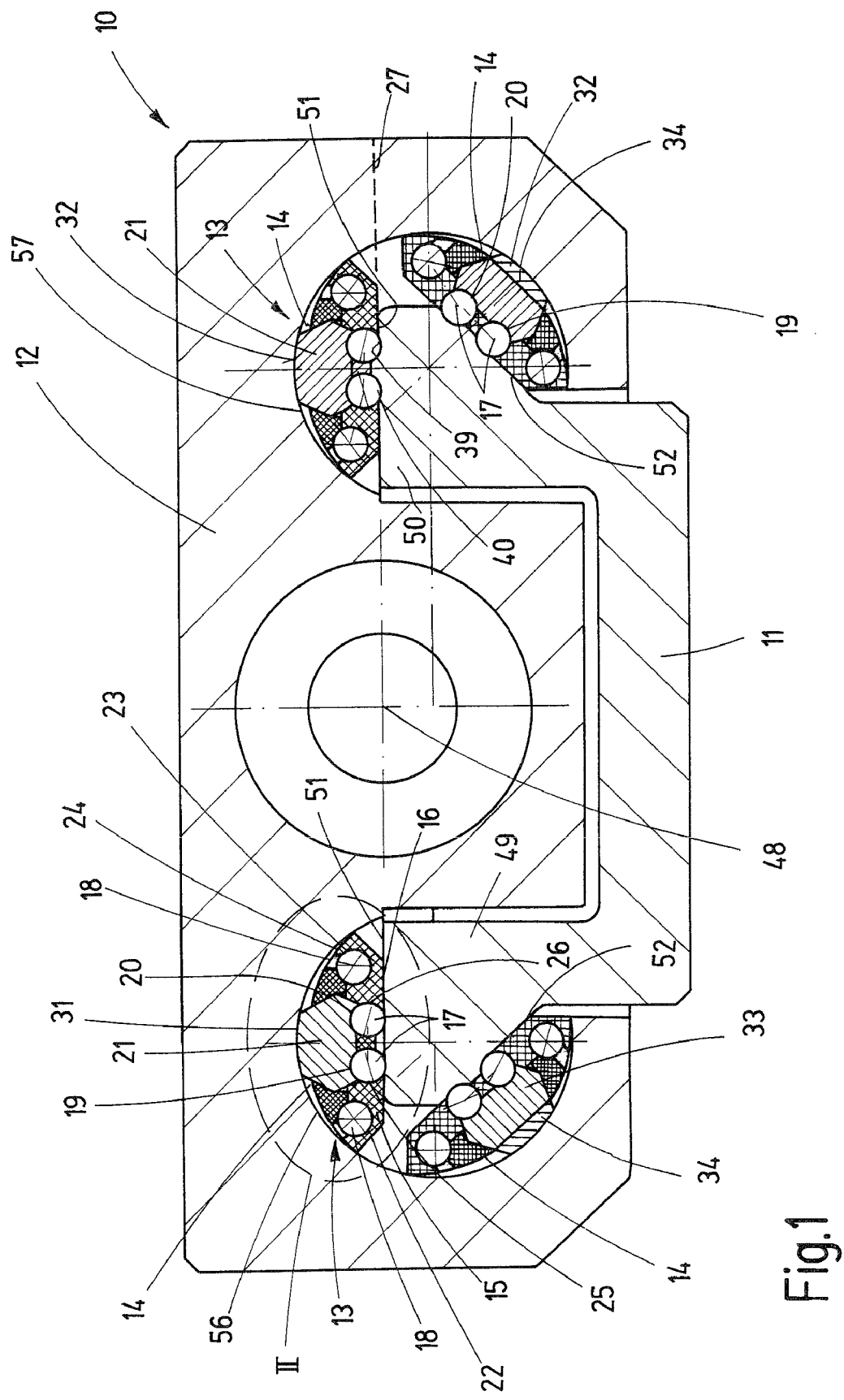
FIG. 1 shows a schematic, vertical cross section of a linear roller bearing guide according to a first exemplary embodiment, which includes four linear roller bearing elements.
Figure 2:
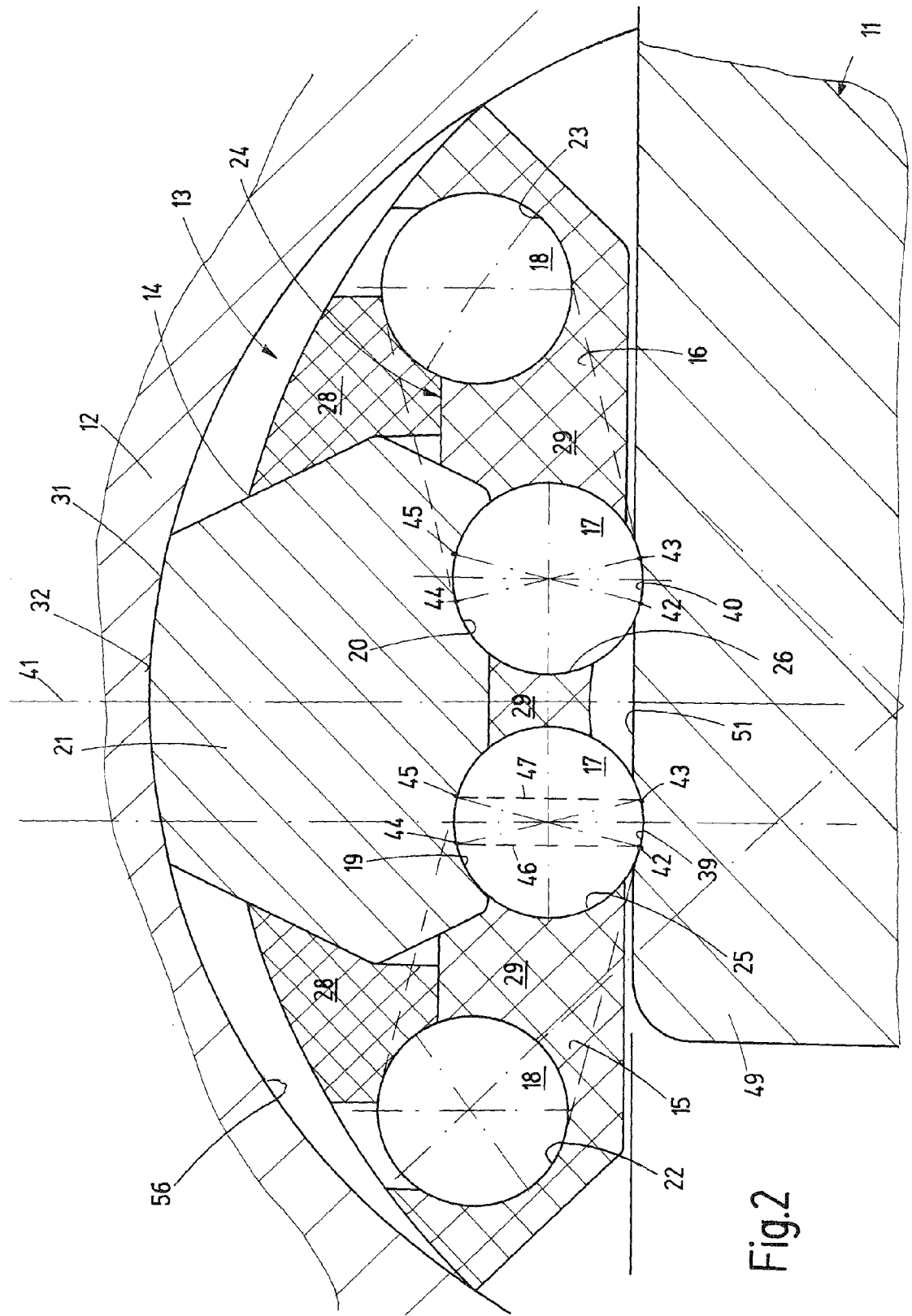
FIG. 2 shows a detail II in FIG. 1 on a larger scale.

FIGS. 1 and 2 are schematic depictions of a linear roller bearing guide 10 with a guide carriage 12 or the like supported on a guide rail 11 such that it is displaceable relative thereto; at least one linear roller bearing element 13—in the form of an independent, ready-to-install raceway element 14—is located between guide rail 11 and guide carriage 12, in order to guide the guide carriage 12.

Special features of the at least one roller bearing element 30—raceway element 14 in particular—are explained in greater detail below with reference to FIGS. 1 through 9.

Linear roller bearing element 13 is designed such that it includes two endless rolling element channels 15 and 16—which transition into each other steplessly along the channel—for load-bearing rolling elements 17 and non-load-bearing rolling elements 18. In this case, rolling elements 17, 18 are composed of balls, which preferably have a relatively small diameter. Every rolling element channel 15, 16 is composed of a carrier raceway 19 and 20 on a carrier body 21 for load-bearing rolling elements 17, a return channel 22 and 23—formed via a cage element 24—for the returning, non-load bearing rolling elements 18, and not-shown turnaround channels.

The turnaround channels—located at both axial ends of roller bearing element 13—steplessly connect return channel 22 or 23 with its respective carrier raceway 19 or 20 for each rolling element channel 15, 16, and they steplessly interconnect holding channels 25 and 26 extending inside cage element 24, so that rolling element channels 15, 16 are smooth, continuous, endless channels, along which rolling elements 17, 18 are movable. The not-shown turnaround channels are bounded at the ends of particular roller bearing element 13 with end covers.

As shown, each roller bearing element 14 includes two rolling element channels 15, 16 and, therefore, two carrier raceways 19, 20 on carrier body 21 for load-bearing rolling elements 17. The two carrier raceways 19, 20 are located in a common plane 27, are adjacent to each other with clearance between them, and they extend longitudinally. Two return channels 22 and 23 for returning rolling elements 18 and particular turnaround channels on the axial ends are assigned to these two carrier raceways 19, 20 on carrier body 21.

In the exemplary embodiment shown in FIGS. 1 and 2, cage element 24 is designed as two pieces. It is composed of two cage pieces 28, 29, which are connected with each other and carrier body 21. Two return channels 22, 23 are formed between the two cage pieces 28, 29. The rolling elements—load-bearing rolling elements 17 in particular—are captively held on two carrier raceways 19, 20 via cage element 24, i.e., by one cage piece 29. Cage element 24 is made of plastic, while carrier body 21 is made of steel. In the exemplary embodiment shown in FIG. 3 and FIG. 8 as well, cage element 24 for each raceway element 14 is a two-piece design, composed of two cage pieces 28 and 29. In the third exemplary embodiment, shown in FIGS. 4 and 6, and in the fourth exemplary embodiment shown in FIG. 7, a single-piece cage element 24 is provided, however, which is assigned to carrier body 21, is connected therewith, and contains two return channels 22, 23.

In the first exemplary embodiment shown in FIGS. 1 and 2, carrier body 21 includes—on its back side 31 facing away from the two adjacently extending carrier tracks 19, 20—at least one outer surface 32 that is curved in a convex manner in this exemplary embodiment and extends across a portion of the length of carrier body 21 or across its entire length. The curvature of outer surface 32 extends around a not—shown longitudinal axis, which extends nearly parallel to the two carrier raceways 19, 20. Outer surface 32 may be designed to approximate a segment of a circular arc. Instead of convexly curved outer surface 32, back side 31 may also be curved in a concave manner and also extend, e.g., nearly as a segment of a circular arc.

As an alternative, this curvature on back side 31 may extend around two axes, i.e., it may be spherical, concave or convex, as will be explained in greater detail below with reference to the exemplary embodiments shown in FIGS. 4 through 9. The single-axis, concave curvature of outer surface 32 is designed such that it enables raceway element 14 to automatically adjust around a longitudinal axis that is nearly parallel to the two carrier raceways 19, 20, and for the load to be distributed evenly on individual, load-bearing rolling elements 17.

This applies for the biaxial, convex curvature according to FIGS. 1 and 2 on outer surface 32 and, instead, for its concave curvature, or, instead, for its biaxial, i.e., spherical segment-shaped curvature shown in FIGS. 4 through 9. With a biaxial, convex or concave curvature of outer surface 32 of this type, it is designed such that it enables raceway element 14 to automatically adjust around a longitudinal axis that is nearly parallel to the two carrier raceways 19, and around a transverse axis extending tranversely thereto, nearly at a right angle in particular, and for the load to be distributed evenly on individual, load-bearing rolling elements 17.

In the first exemplary embodiment, shown in FIGS. 1 and 2, linear roller bearing guide 10 includes two upper raceway elements 14 of the type described, with which convexly curved outer surface 32 is a single-pieced component of particular carrier body 21. Roller bearing guide 10 also includes two lower, bilateral raceway elements 14, with which—in deviation from upper raceway elements 14 of carrier body 21—are composed of two pieces, i.e., piece 33, which includes the two carrier raceways 19, 20, and a rear carrier piece 34, which includes outer surface 32, which is curved concavely or convexly around one or two axes. The contact surface between piece 33 and carrier piece 34 is flat, not curved. This design of two lower raceway elements 14 that includes carrier piece 34 makes it possible to balance the guides when they are adjusted.

In FIGS. 1 and 2, it is shown that, for each rolling element channel 15, 16, their end-side turnaround channels—starting from particular carrier raceway 19, 20 and holding channel 25, 26 in cage piece 29—are oriented nearly horizontally outwardly. Return channels 22, 23, which are assigned to carrier raceways 19 and 20, respectively, are located in raceway element 14 with considerable distance between them, next to assigned carrier raceways 19, 20, as shown on the left and right in FIG. 2.

Return channels 22, 23 are located next to carrier body 21, with clearance. This has the advantage that the carrier cross section of carrier body 21 and the region of guide carriage 12 bearing against carrier body 21 are not weakened in terms of their cross section by the course of the return channels there. It is therefore ensured that raceway elements 14 are supported via carrier bodies 21 against a solid region of guide carriage 12 and in a solid manner. Any weakenings of the cross section that may be necessary are avoided. This simplifies the manufacture and increases the stiffness.

Individual raceway elements 14 are independent, ready-to-install elements, and they are fully functional in and of themselves. Load-bearing rolling elements 17 are captively held in cage 24 such that a circumferential portion of them extends toward guide rail 11.

In the first exemplary embodiment, as shown in FIGS. 1 and 2, and in the exemplary embodiments shown in FIGS. 3 through 6, the cross section of individual raceway elements 14 is designed nearly in the shape of a half moon; the two carrier raceways 19, 20 are provided in the flat region of the half moon-shaped cross section. In the exemplary embodiments shown in FIGS. 7 and 8, however, the cross section of raceway elements 14 is designed nearly as an annular segment. The two carrier raceways 19, 20 shown in FIG. 7 are provided on the outer side of the arc, and they are provided on the inner side of the arc of the annular segment in the example shown in FIG. 8.

It is understood that, e.g., in the exemplary embodiment shown in FIGS. 1 and 2, it is possible, if necessary, to locate several raceway elements 14—instead of only one raceway element 14—between guide rail 11 and guide carriage 12, as viewed in the direction of longitudinal motion, with clearance between them in the longitudinal direction. As shown, several raceway elements 14 are located between guide rail 11 and guide carriage 12—as viewed transversely to the direction of longitudinal motion. A total of four raceway elements 14 of this type are provided in the exemplary embodiment in FIGS. 1 and 2. In another, not-shown exemplary embodiment, at least three raceway elements 14 of this type are provided, i.e., one raceway element 14 on each on each longitudinal side, and at least one further raceway element 14 on the top side of guide rail 11 between guide rail 11 and guide carriage 12.

In general, guide rail 11 includes several—preferably at least three—longitudinally oriented guide tracks for particular guides. Each guide track of guide rail 11 includes two recessed raceways 39, 40 within the same plane 27, which are located next to each other with clearance, extend longitudinally, and are assigned to the two carrier raceways 19, 20. These two raceways 39, 40 of each individual guide track of guide rail 11 are located on either side of—and symmetrical to—a normal of contact 41 shown only in FIG. 2. Raceways 39, 40 of each guide track of guide rail 11 and/or assigned carrier raceways 19, 20 of a raceway element 14—carrier body 21 in particular—are composed—as viewed in the cross section—of two arc segments having different radii, with the formation of four-point bearing supports for spherical rolling elements 17. These four contact points are indicated by points 42 through 45 in FIG. 2.

Since raceway element 14 may oscillate around a longitudinal axis due to the convex curvature of outer surface 32, the load is distributed evenly between right and left raceway 39, 40 shown in FIG. 2, and carrier raceway 19, 20. Rolling elements 17 therefore rotate around axes that are positioned at a right angle to the connecting lines of points of contact of rolling elements 17. Rolling elements 17 may therefore roll without any geometric restrictions or slip. Raceway points of contact 42, 43 of guide rail 11 and points of contact 44, 45 of raceway element 14—carrier body 21 thereof, in particular—assigned to each guide track are located on parallels 46 and 47 normal of contact 41, which is simultaneously the supporting normal. Raceways 39, 40 of a particular guide track of guide rail 11 are flat and only slightly recessed. This has advantages not only in terms of fabrication, but it also results in a more favorable loading of rolling elements 17 and carrier raceways 19, 20, and in greater stiffness of guide rail 11. It also results in quieter running when guide carriage 12 is displaced relative to guide rail 11, and vice versa. In the cross section, raceways 39, 40 of a particular guide track of guide rail 11 are designed nearly as a segment of a circular arc, or with a gothic shape.

As shown in the first exemplary embodiment in FIGS. 1 and 2, guide rail 11 includes two rail longitudinal elements 49, 50, which are symmetrical to longitudinal center axis 48, and which—in the first exemplary embodiment—include guide tracks which extend nearly in parallel with each other on their respective outer sides, and in parallel with longitudinal central axis 48. In the exemplary embodiment shown in FIG. 7, on the other hand, rail longitudinal elements 49, 50 include guide tracks on their inner side that are parallel to each other. In the example shown in FIGS. 1 and 2, each of the rail longitudinal elements 49, 50 includes an upper, nearly horizontally extending guide track 51, and a guide track 52 that extends obliquely from the outside toward the inside and is slanted downward.

Horizontal guide track 51 extends nearly in the region of horizontal plane 27. In the second exemplary embodiment, shown in FIG. 3, and the third exemplary embodiment, shown in FIGS. 4 through 6, a further, oblique guide track 53 is present, instead of upper, nearly horizontal guide track 51 shown in FIGS. 1 and 2. As a result, rail longitudinal elements 49, 50 each have two oblique guide tracks 52, 53. Upper guide track 53 is slanted downward from the inside toward the outside, and lower, oblique guide track 52 is slanted downward from the outside toward the inside.

Both guide tracks 52, 53 therefore nearly form a truncated wedge that is oriented outwardly. In another, not-shown exemplary embodiment, each rail longitudinal element 49, 50 may also include two slanted guide tracks, which extend diagonally from the outside to the inside and nearly form an inwardly oriented wedge. In the exemplary embodiment shown in FIG. 7, each rail longitudinal element 49, 50 includes a concave side slot 54, with a cross section designed nearly as a segment of a circular arc, and with two separated guide tracks for raceway elements 14, which are formed on this segment of a circular arc.

Figure 8:
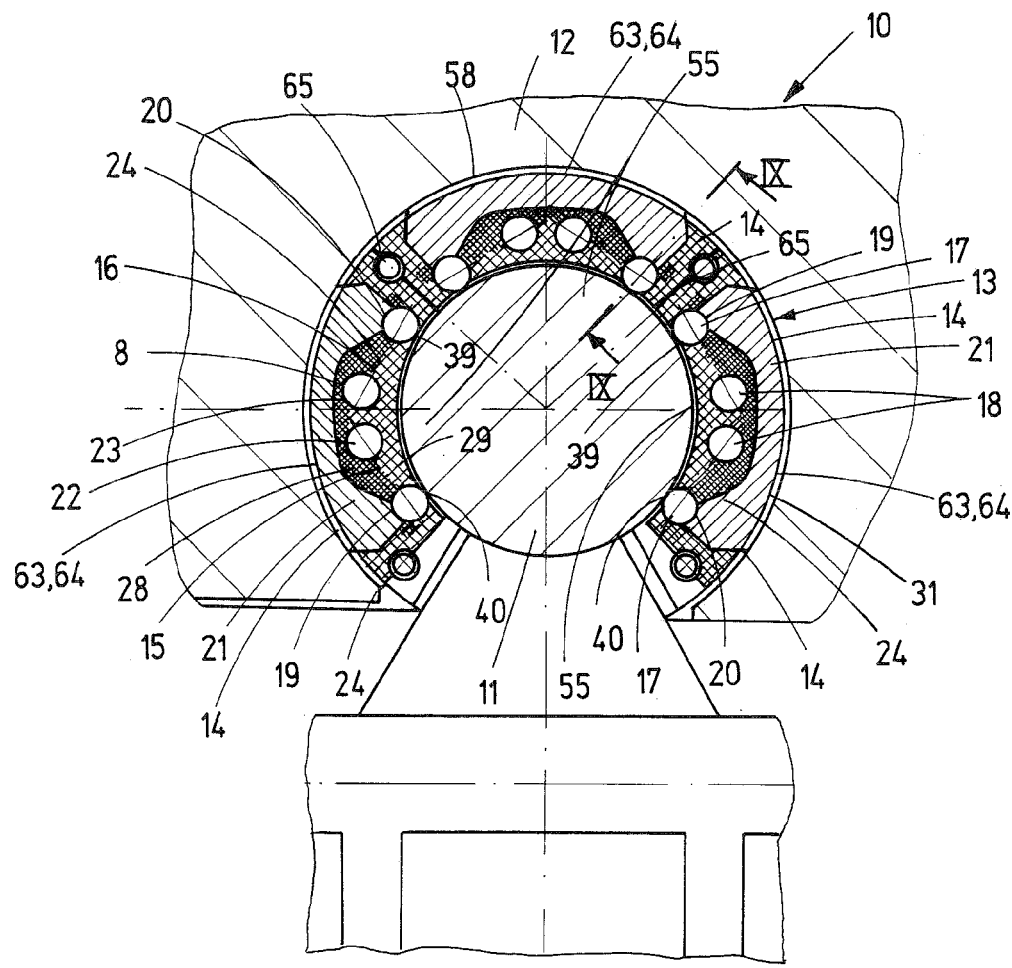
FIG. 8 shows a schematic, vertical cross section of a linear roller bearing guide according to a fifth exemplary embodiment.
Figure 9:
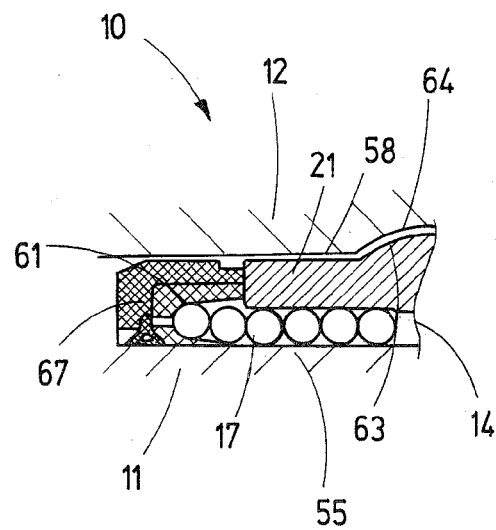
FIG. 9 shows a schematic cross section along the line IX-IX in FIG. 8 of a part of the roller bearing guide shown there.

In the fifth exemplary embodiment, shown in FIGS. 8 and 9, guide rail 11 has a nearly circular cross section and, therefore, a cylindrical shape. Three convex regions 55 are formed, which have cross sections formed nearly as a segment of a circular arc and which form three guide tracks—located in succession in the circumferential direction—for assigned raceway elements 14.

Guide carriage 12 includes two longitudinal grooves 56, 57, which are designed nearly as a segment of a circular arc, and which are positioned symmetrically on either side of longitudinal central axis 48. In contrast, and as is the case only with the example shown in FIGS. 8 and 9, guide carriage 12 includes a partially cylindrical longitudinal groove 58, which extends across a circumferential angle that is clearly greater than 180°, but which is smaller than the 360° circumferential angle. When FIGS. 1 and 2 are considered first, it is clear that assigned rail longitudinal elements 49 and 50 of guide rail 11 are accommodated in bilateral longitudinal grooves 56, 57 of guide carriage 12, and, in fact together with raceway elements 14, which perform their respective guidance functions.

Raceway elements 14 bear radially against particular longitudinal groove 56, 57 via their outer surface 32 of back side 31 which has the single-axis, conformal curvature shown in FIGS. 1 and 2. Convexly curved outer surface 32 conforms with the curvature of longitudinal groove 56, 57—designed as a segment of a circular arc—so that each raceway element 14 is located within and bears against longitudinal groove 56, 57 via curved outer surface 32 of carrier body 21, while the remaining region of raceway element 14 extends along the outside of and with radial clearance from longitudinal groove 56, 57 such that there is no contact with longitudinal groove 56, 57, thereby making it possible for particular raceway element 14 with curved outer surface 32 to oscillate relative to longitudinal groove 56, 57.

Figure 3:
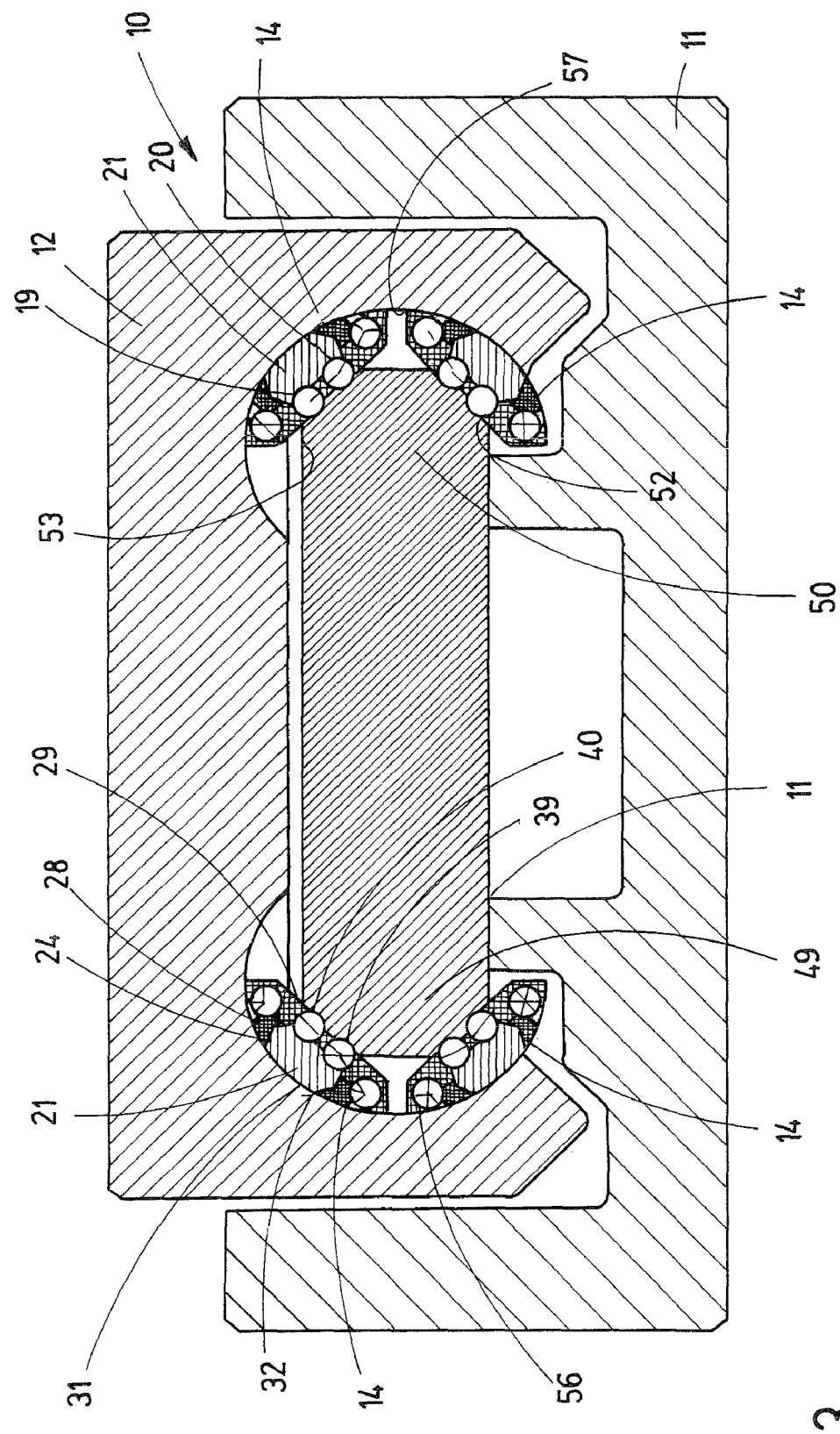
FIG. 3 shows a schematic, vertical cross section of a linear roller bearing guide according to a second exemplary embodiment.

With regard for FIGS. 1 through 3, it is not shown that individual raceway elements 14 are acted upon with a spring force in the direction of guide rail 11 and are pressed against guide rail 11. This ensures that rolling elements 17 always have contact with carrier raceways 19, 20 and raceways 39, 40, and that they roll smoothly when making the relative longitudinal motion, without the risk of slipping. The spring force may be produced in a variety of different manners. In a not-shown exemplary embodiment, suitable holding elements, for example, are installed on individual raceway elements 14, which engage elastically in assigned receptacles of guide carriage 12 when standalone raceway elements 14 are installed.

In the exemplary embodiment shown in FIGS. 4 through 6, e.g., elastic holding elements 59, 60, e.g., in the form of spring brackets that are attachable to guide carriage 12, grip on each end of raceway element 14. Bilateral turnaround channels 61, 62 are also shown in FIG. 5 of this exemplary embodiment, by way of which load-bearing rolling elements 17 are redirected into assigned return channel 23. Holding elements 59, 60 in the form of spring brackets, for example, act via their deflectable ends on raceway elements 14 at least in the radial direction such that spring force is applied to raceway elements 14 in the direction of carrier rail 11. Slip is prevented in this manner. Holding elements 59, 60 may also act on raceway elements 14 with axial spring force, if necessary. At the least, they position raceway elements 14 in the longitudinal direction relative to guide carriage 12.

Raceway elements 14 described are independent, ready-to-install components, which, as explained, include two rolling element channels 15, 16 and therefore contain carrier raceway 19, 20 realized with carrier body 21, assigned return channel 22, 23 formed by cage element 24, and assigned turnaround channels 61, 62 (FIG. 5), and they may be handled as standalone elements and used as needed. In the exemplary embodiment shown in FIGS. 1 through 3, individual raceway elements 14 are supported via their particular carrier body 21 in longitudinal groove 56, 57 of guide carriage 12 such that the load is distributed on rolling elements 17 as evenly as possible. This is made possible via the capability of raceway elements 14 to swivel automatically relative to longitudinal groove 56, 57, since particular carrier body 21 bears via its partially cylindrical outer surface 32 against longitudinal groove 56, 57 and may automatically self-adjust its seat, in the manner of a rocker.

It is also advantageous that raceway elements 14 require only a small amount of installation space, do not cause a weakening of the cross section in the region of particular carrier body 21 and guide carriage 12, and make compact roller bearing guides 10 possible, due to the small amount of installation space required. Despite its small dimensions, roller bearing guide 10 provides great stiffness and makes simple, cost-favorable manufacture possible. In the exemplary embodiment shown in FIGS. 1 through 3, independent, ready-to-install raceway elements 14 are held in position in the longitudinal direction relative to guide carriage 12 via cylindrical outer surface 32 extending, e.g., in the longitudinal direction, using not-shown holding elements, which may be elastic and may engage in related receiving contours of guide carriage 12 when raceway elements 14 are inserted.

In the third exemplary embodiment, which is shown in FIGS. 4 through 6, particular carrier body 21 of each raceway element 14 is provided with a biaxial curvature 63 designed as a segment of a circular arc on its back side 31 facing away from carrier raceways 19, 20. In this exemplary embodiment, curvature 63 is convex, i.e., it is designed in the shape of a ball. In another, not-shown exemplary embodiment, it may be concave in design, however. That is, it may be designed as a recess shaped like a segment of a circular arc. As shown in FIG. 5, biaxial curvature 63 designed nearly as a segment of a circular arc extends nearly in the region of the longitudinal center of carrier body 21. In conformance therewith, assigned particular longitudinal groove 56, 57 is provided—in the region of the longitudinal center—with a recess 64 curved around two axes, which meshes with curvature 63. In this manner, particular raceway element 14 is held in the axial direction relative to guide carriage 12, without the need for any additional elements.

Mainly, it is attained that individual raceway elements 14 may each move—automatically, and in a manner similar to a ball joint—around a longitudinal axis and a transverse axis relative to guide carriage 12, and thereby automatically orient themselves relative to raceways 39, 40 of guide rail 11 such that the load is distributed on individual, load-bearing rolling elements 17 as evenly as possible. Simultaneously, due to the form-fit connection of curvature 63, which engages in recess 64 and is designed nearly as a segment of a circular arc, an axial hold of particular raceway element 14 relative to guide carriage 12 is attained, without the need for any special additional holding elements. It is clear that, with regard for curvature 63 and matching recess 64, a kinematic turnaround is also possible; the convex, spherical segment-shaped curvature is provided in the region of longitudinal groove 56, 57 of guide carriage 12, and the related, spherical segment-shaped recess is realized in raceway element 14, i.e., in its carrier body 21 in particular.

The embodiment shown in FIGS. 4 through 6 is more favorable, since, to realize recess 64, it is only necessary to provide a circumferential pass in particular longitudinal groove 56 and 57 with a contour shaped like a spherical segment. Holding elements 59, 60—which have spring-action, in particular—make it possible to insert raceway elements 14 in longitudinal grooves 56, 57 and position them axially, as shown in FIG. 5. According to FIG. 5, individual raceway elements 14 in longitudinal grooves 56, 57 abut each other in the circumferential direction of each longitudinal groove 56, 57 with only a slight amount of clearance between them. Spacers 65 may be inserted in this intermediate region as necessary, as shown in FIG. 8.

In the exemplary embodiments shown in FIGS. 7 through 9, individual raceway elements 14 are movable, in a self-adjusting manner, around a longitudinal axis that is nearly parallel with raceways 39, 40 of guide rail 11, and around a transverse axis extending transversely thereto, i.e., nearly at a right angle, in particular. This is attained via convex, spherical segment-shaped curvature 63 and assigned, nearly spherical segment-shaped recess 64, which is provided in the region of longitudinal grooves 56, 57, e.g., nearly in the region of the longitudinal center. In the example shown in FIG. 7, nearly cylindrical, e.g., tubular elements—as support elements 66—are located between raceway elements 14 next to particular side slot 54 and particular longitudinal groove 56, 57 in guide carriage 12.

Support elements 66 have elastic spring action and serve to preload raceway elements 14 in the direction toward guide rail 11. This ensures that rolling elements 17 are always held in contact with raceways 39, 40 and carrier raceways 19, 20, and that slip is prevented. Support elements 66 also help to position raceway elements 14 in the longitudinal direction of longitudinal grooves 56, 57. Particular longitudinal groove 56, 57 includes, e.g., in the region of the longitudinal center, a nearly spherical segment-shaped recess 64, e.g., nearly corresponding to the one shown in FIG. 5. On its outer side, each support element 66 has a spherical segment-shaped curvature 63 that nearly corresponds to that shown in FIG. 5, and support element 66 is accommodated with curvature 63 in recess 64 of longitudinal groove 56, 57, thereby resulting in a biaxial tilting motion of particular support element 66 relative to guide carriage 12.

Spherical segment-shaped recess 64 in longitudinal groove 56, 57 serves as a supporting surface for supporting particular support element 66 such that it may move around two axes. To conform with this design, if necessary, carrier body 21 of raceway elements 14 with a concave and, therefore, nearly spherical segment-shaped outer side may bear against the convex supporting surface of particular spacer 66, thereby ensuring that raceway elements 14 may also move around two axes relative to support elements 66, for balance, and to adapt to raceways 39, 40.

In the exemplary embodiment shown in FIGS. 8 and 9, guide carriage 12 includes—inside partially cylindrical longitudinal groove 58, analogously to FIG. 5—a nearly spherical segment-shaped recess 64 that is curved around two axes. In conformance therewith, carrier body 21 of each raceway element 14 is provided with a biaxial, nearly spherical segment-shaped curvature 63 on its back side 31. Curvature 63 is movably accommodated in recess 64. Each raceway element 14 is therefore capable of swiveling automatically around two axes relative to guide carriage 12, thereby allowing it to adapt automatically to the course of particular raceway 39, 40 of guide rail 11 such that the load is distributed on individual, load-bearing rolling elements 17 as evenly as possible.

FIG. 9 shows a turnaround channel 61, which is bounded by an end cover 67. FIG. 8 shows that carrier raceways 19, 20 of each raceway element 14 have clearance between them—as viewed in the circumferential direction—and extend such that carrier raceways 19, 20 are placed at the respective ends of annular segment-shaped carrier body 21. Two-pieced cage element 24 is located therebetween and forms assigned return channels 22, 23 for rolling elements 18. Three guide tracks and convex regions 55 are formed on the circumference of partially cylindrical rail longitudinal element, to which three raceway elements 14 are assigned. Raceway elements 14 are situated relatively close to each other in the circumferential direction. This design has the advantage, in particular, that large loads placed on guide carriage 12 may be absorbed by load-bearing rolling elements 17 that are placed relatively far downward.

Roller bearing guide 10 according to the present invention has the advantage, in particular, that it results in a rolling element circulation without slip, since individual raceway elements 14 with carrier body 21 may adjust automatically. This makes it possible to design the rolling element raceways formed by raceways 39, 40 and carrier raceways 19, 20 as four-point contact bearings with a small contact angle. As a result, the load-carrying capacity of the rolling element contact may be nearly doubled. This makes it possible to attain roller bearing guides 10 with extremely high load-carrying capacities, which are also compact, relatively easy to manufacture, and require very little installation space. Individual raceway elements 14 are usable as independent, ready-to-install components for different profiles of guide rails.

It will be understood that each of the elements described above, or two or more together, may also find a useful application in other types of constructions differing from the type described above.

While the invention has been illustrated and described as embodied in a linear roller bearing element, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A linear roller bearing element, comprising a first endless rolling element channel composed of a first carrier raceway for load-bearing rolling elements on a carrier body, a first return channel for rolling elements that are returning, and first turnaround channels that connect the first carrier raceway with the first return channel at both ends in an endless manner, wherein the first turnaround channels are bounded, and a second rolling element channel with a second carrier raceway, a second return channel for rolling elements that are returning, and second turnaround channels that connect the second carrier raceway with the second return channel at both ends in an endless manner, wherein said first carrier raceway and said second carrier raceway extend longitudinally and are located next to each other within a common plane and with a clearance between them on the carrier body for load-bearing rolling elements.

2. A linear roller bearing element as defined in claim 1, wherein the linear roller bearing element is configured as an independent and ready-to-install raceway element that includes the two rolling element channels.

3. A linear roller bearing element as defined in claim 1, further comprising a one-pieced cage element that is assigned to the carrier body, is connected with the carrier body, and contains the first and second channels.

4. A linear roller bearing element as defined in claim 1, wherein the carrier body on its back side facing away from its first and second carrier raceway has an outer surface that is curved in a manner selected from the group consisting of a convex manner and a concave manner and around two axes.

5. A linear roller bearing element as defined in claim 4, wherein the outer surface which is curved around the two axes extends substantially in a region of a longitudinal center of the carrier body.

6. A linear roller bearing element as defined in claim 4, wherein a-said curved outer surface around the two axes is configured substantially in a shape of a spherical segment.

7. A linear roller bearing element as defined in claim 4, wherein said curved outer surface around the two axes is configured so that the raceway element automatically adjusts around a longitudinal axis that is substantially parallel to the first and second carrier raceway and around a transverse axis extending transversely to it substantially at a right angle to distribute a load evenly on the load-bearing rolling elements.

8. A linear roller bearing element as defined in claim 1, wherein each of the return channels which is assigned to the respective carrier raceway is located in the raceway element next to and with a clearance from the respective carrier raceway.

9. A linear roller bearing element as defined in claim 1, wherein the rolling elements are captively held via the cage element relative to the two carrier raceways.

10. A linear roller bearing element as defined in claim 1, wherein the rolling elements are balls.

11. A linear roller bearing element as defined in claim 1, wherein the raceway elements have a cross-section configured substantially in a shape selected from the group consisting of a half moon and an annular segment, the carrier raceways being provided in a location selected from the group consisting of a flat region of the half moon-shaped cross-section and on an outer side or inner side of a curve of the annular segment.

12. A linear roller bearing guide, comprising at least one linear roller bearing element as defined in claim 1 and located between a guide rail and a guide carriage supported on said guide rail displaceably relative to the latter in order to guide the guide carriage.

13. A linear roller bearing guide as defined in claim 12, wherein several of said linear roller bearing elements in form of independent raceway elements are located between the guide rail and the guide carraige as viewed transversely to a direction of longitudinal direction.

14. A linear roller bearing guide as defined in claim 13, wherein said plurality of linear roller bearing elements include three linear roller bearing elements.

15. A linear roller bearing guide as defined in claim 12, wherein said guide rail includes a plurality of longitudinally oriented guide tracks.

16. A linear roller bearing guide as defined in claim 15, wherein said plurality of longitudinally oriented guide tracks includes three longitudinally oriented guide tracks.

17. A linear roller bearing guide as defined in claim 12, wherein the guide rail includes for each guide track with at least one raceway element two recessed raceways, which are located next to each other with a clearance within a common plane, extend longitudinally and are assigned to the carrier raceways.

18. A linear roller bearing guide as defined in claim 17, wherein the two raceways of one guide track are located, symmetrically, on both sides of a normal of the contact between said roller bearing element and said guide carriage.

19. A linear roller bearing guide as defined in claim 12, wherein raceway points of contact of the guide rail and the raceway elements assigned to each guide track, of the carrier body, lie on parallels to a normal of the contact between said roller bearing element and said guide carriage.

20. A linear roller bearing guide as defined in claim 12, wherein the raceways of a guide track are flat and only slightly recessed.

21. A linear roller bearing guide as defined in claim 12, wherein the raceways of a guide track of the guide rail have cross-sections selected from the group consisting of substantially as a segment of a circular arc and substantially with a gothic shape.

22. A linear roller bearing guide as defined in claim 12, wherein said guide rail includes two rail longitudinal elements which are symmetrical relative to a longitudinal central axis and include parallel guide tracks at a location selected from the group consisting of their outside and their inside.

23. A linear roller bearing guide as defined in claim 22, wherein each rail longitudinal element includes two slanting guide tracks, with one upper slanted guide track being directed downwards from the inside toward the outside, and a lower slanted guide track which is slanted downwards from the outside toward the inside, wherein the guide tracks substantially form an outwardly oriented wedge.

24. A linear roller bearing guide as defined in claim 22, wherein the guide carriage includes two longitudinal grooves that are symmetrical relative to a longitudinal central axis, in which the rail longitudinal elements of the guide rail and the raceway elements, which serve to guide, are accommodated, the raceway elements bearing against the corresponding one longitudinal grooves via their outer surface with a conformal curvature selected from the group consisting of a single-axis curvature and a biaxial curvature.

25. A linear roller bearing guide as defined in claim 24, wherein the raceway elements with their outer surface curved around one or two axes, are movable in a self-adjusting manner relative to the guide carriage in the longitudinal groove around an axis selected from the group consisting of a longitudinal axis that is substantially parallel to the raceways, a transverse axis that extends transversely thereto, and both, substantially at a right angle.

26. A linear roller bearing guide as defined in claim 12, further comprising elastic holding elements used for fixing the raceway elements individually in position elastically on the guide carriage.

27. A linear roller bearing guide as defined in claim 26, wherein the holding elements are configured as spring brackets which are held on an end of the guide carriage and have a spring action selected from the group consisting of a radial spring action, an axial spring action, and both, on the raceway elements via their deflectable ends.

* * * * *